US009266179B2

(12) United States Patent
Geiser

(10) Patent No.: US 9,266,179 B2
(45) Date of Patent: Feb. 23, 2016

(54) METHOD FOR DRESSING A TOOL

(75) Inventor: Hansjoerg Geiser, Wiggensbach (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 506 days.

(21) Appl. No.: 13/484,177

(22) Filed: May 30, 2012

(65) Prior Publication Data
US 2012/0309271 A1 Dec. 6, 2012

(30) Foreign Application Priority Data

Jun. 1, 2011 (DE) .......................... 10 2011 103 216

(51) Int. Cl.
B24B 49/18 (2006.01)
B24B 53/075 (2006.01)
B23F 23/12 (2006.01)
B23F 1/02 (2006.01)
B24B 53/00 (2006.01)

(52) U.S. Cl.
CPC ............... *B23F 23/1225* (2013.01); *B23F 1/02* (2013.01); *B24B 49/18* (2013.01); *B24B 53/00* (2013.01)

(58) Field of Classification Search
CPC ........ B24B 49/00; B24B 49/02; B24B 49/18; B24B 41/02; B24B 41/04; B24B 41/005; B24B 53/00; B24B 53/017; B24B 53/06; B24B 53/062; B24B 53/075; B24B 53/085; B23F 1/02; B23F 1/023; B23F 23/06; B23F 23/08; B23F 23/085; B23F 23/1225; B23F 23/12
USPC ......... 451/5, 9, 10, 11, 47, 56, 443, 147, 219, 451/253
See application file for complete search history.

(56) References Cited

U.S. PATENT DOCUMENTS

| 4,765,095 | A  | * | 8/1988 | Wiener .............................. 451/5 |
| 5,857,894 | A  | * | 1/1999 | Griesbach et al. ................ 451/5 |
| 6,290,574 | B1 | * | 9/2001 | Thyssen ........................... 451/9 |
| 6,712,675 | B1 | * | 3/2004 | Giurgiuman et al. ........... 451/48 |
| 7,083,496 | B2 | * | 8/2006 | Yanase et al. ..................... 451/5 |
| 7,198,543 | B2 | * | 4/2007 | Yanase et al. ..................... 451/5 |
| 7,341,501 | B2 | * | 3/2008 | Yanase et al. ..................... 451/5 |
| 2007/0202774 | A1 | * | 8/2007 | Yanase et al. ..................... 451/5 |
| 2008/0264401 | A1 | * | 10/2008 | Lopez ....................... 125/11.03 |
| 2008/0268750 | A1 | * | 10/2008 | Fisher et al. ...................... 451/5 |

(Continued)

FOREIGN PATENT DOCUMENTS

DE 3886624 T2 5/1994
DE 19625370 C1 4/1997

(Continued)

*Primary Examiner* — Eileen Morgan
(74) *Attorney, Agent, or Firm* — Alleman Hall McCoy Russell & Tuttle LLP

(57) ABSTRACT

A method for dressing a tool of a gear grinding machine, including a workpiece holder and a tool holder, is provided. The tool holder, arranged on a machining head, is rotatable about a first axis of rotation, and is linearly movable via a first linear axis of movement, wherein a workpiece clamped in the workpiece holder can be machined by a tool clamped in the tool holder. The machine furthermore includes a dressing unit with a dressing tool holder rotatable about a second axis of rotation, wherein a dressing tool accommodated in the dressing tool holder is used for dressing the tool clamped in the tool holder. During the dressing operation the machining head is pivoted about the swivel axis in dependence on a tool profile and is linearly moved with the first linear axis of movement.

16 Claims, 12 Drawing Sheets

(56) References Cited

U.S. PATENT DOCUMENTS

| | | | |
|---|---|---|---|
| 2009/0227182 A1* | 9/2009 | Breith et al. | 451/5 |
| 2010/0304642 A1* | 12/2010 | Mundt | 451/5 |
| 2011/0159787 A1* | 6/2011 | Kobialka | 451/56 |
| 2012/0190274 A1* | 7/2012 | Ito et al. | 451/11 |

FOREIGN PATENT DOCUMENTS

| | | |
|---|---|---|
| DE | 29717193 U1 | 11/1997 |
| DE | 10240509 A1 | 3/2004 |
| DE | 10329724 A1 | 1/2005 |
| EP | 2161092 A1 | 3/2010 |

\* cited by examiner

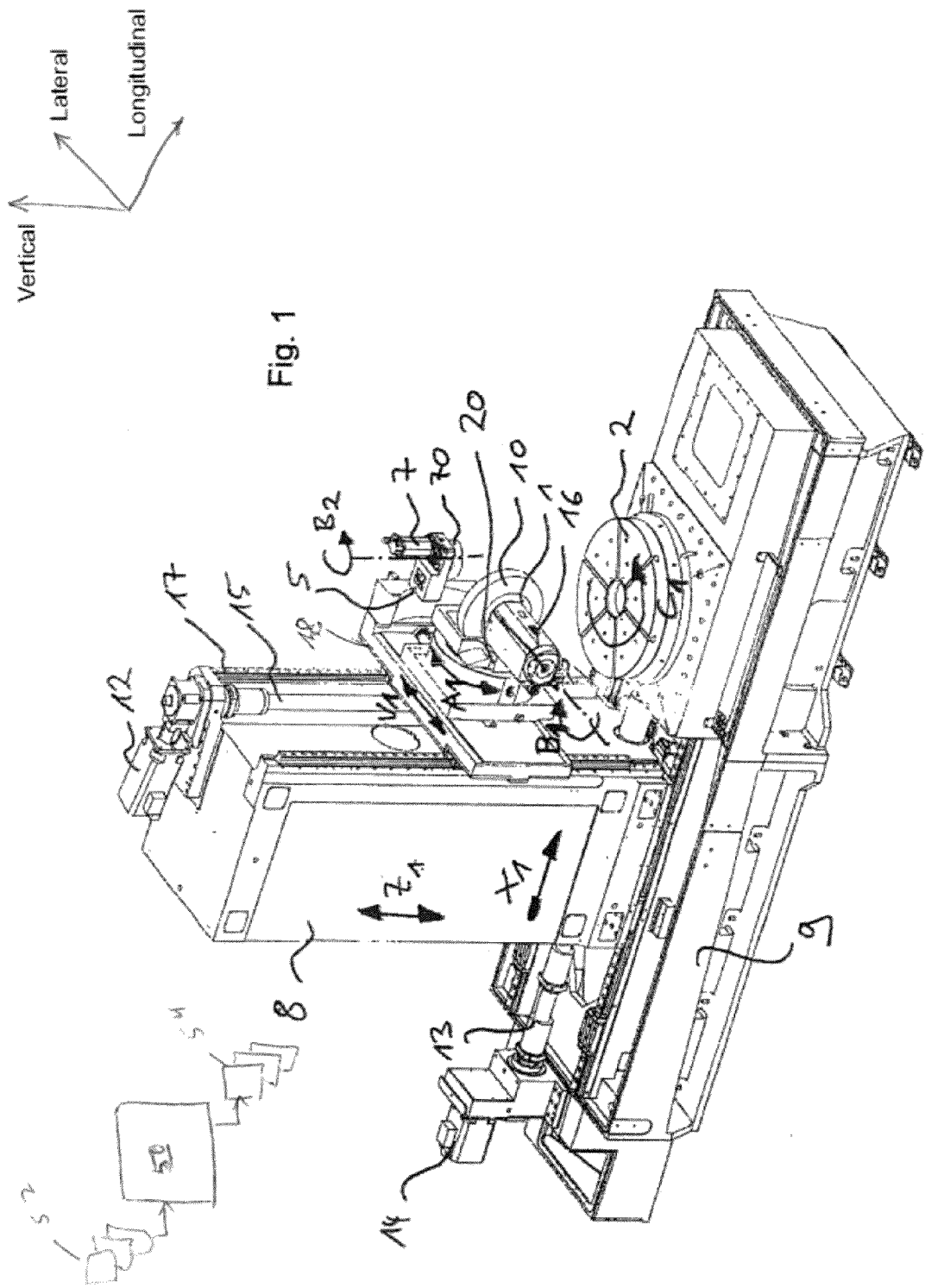

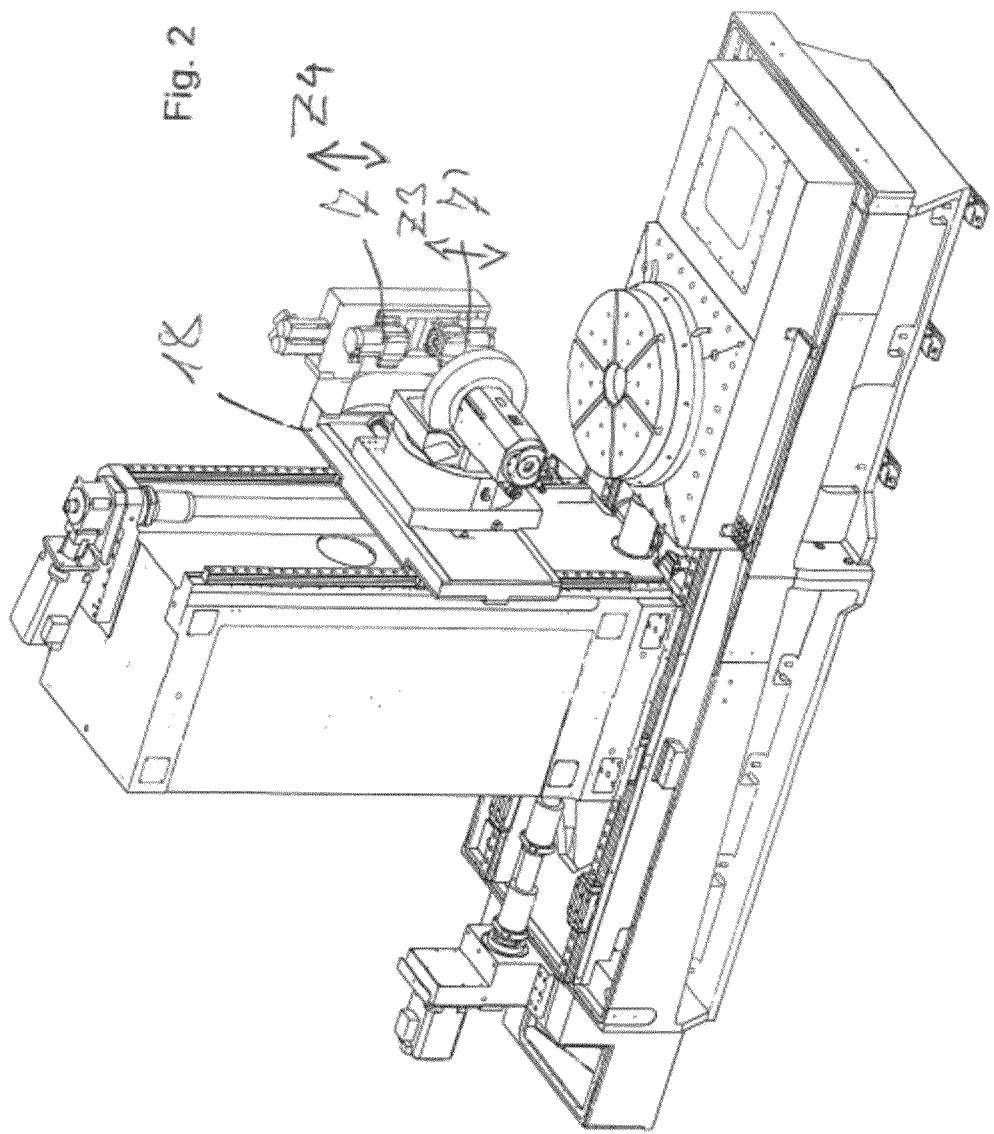

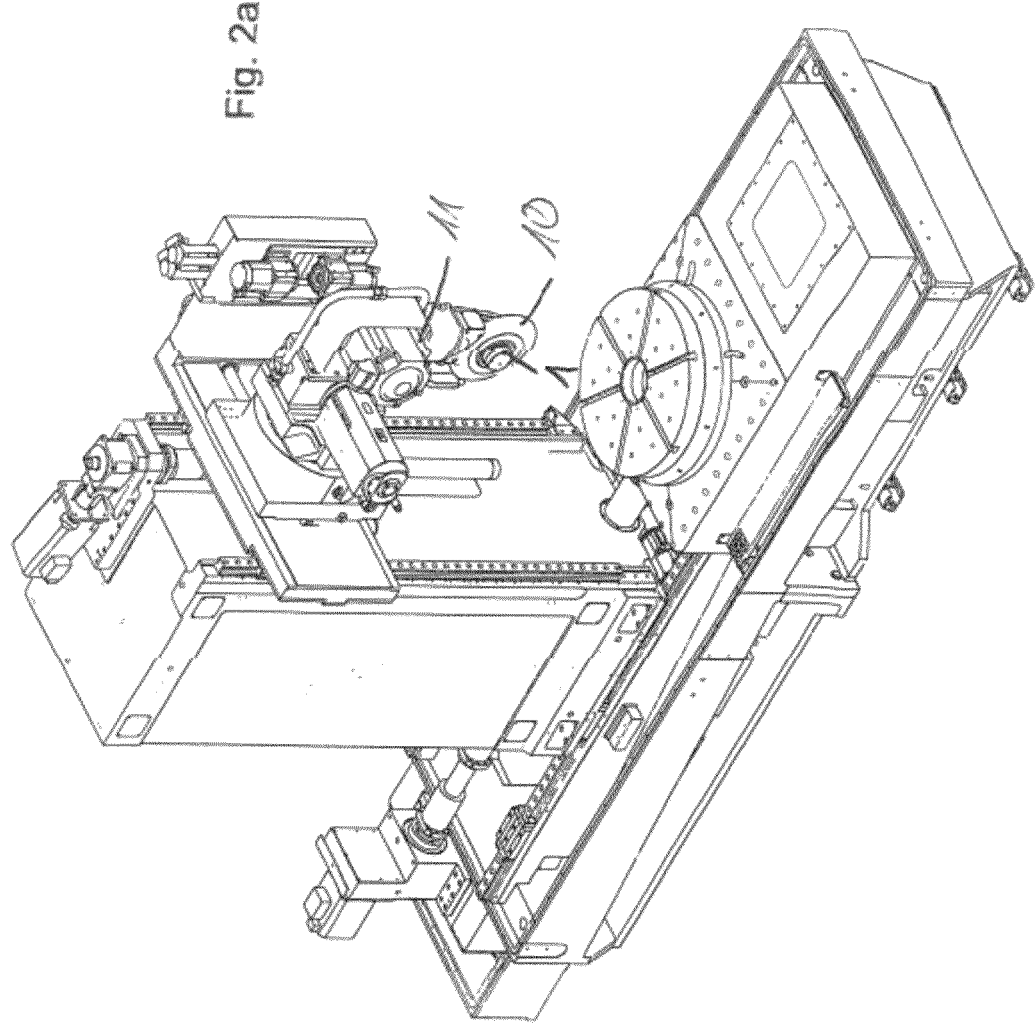

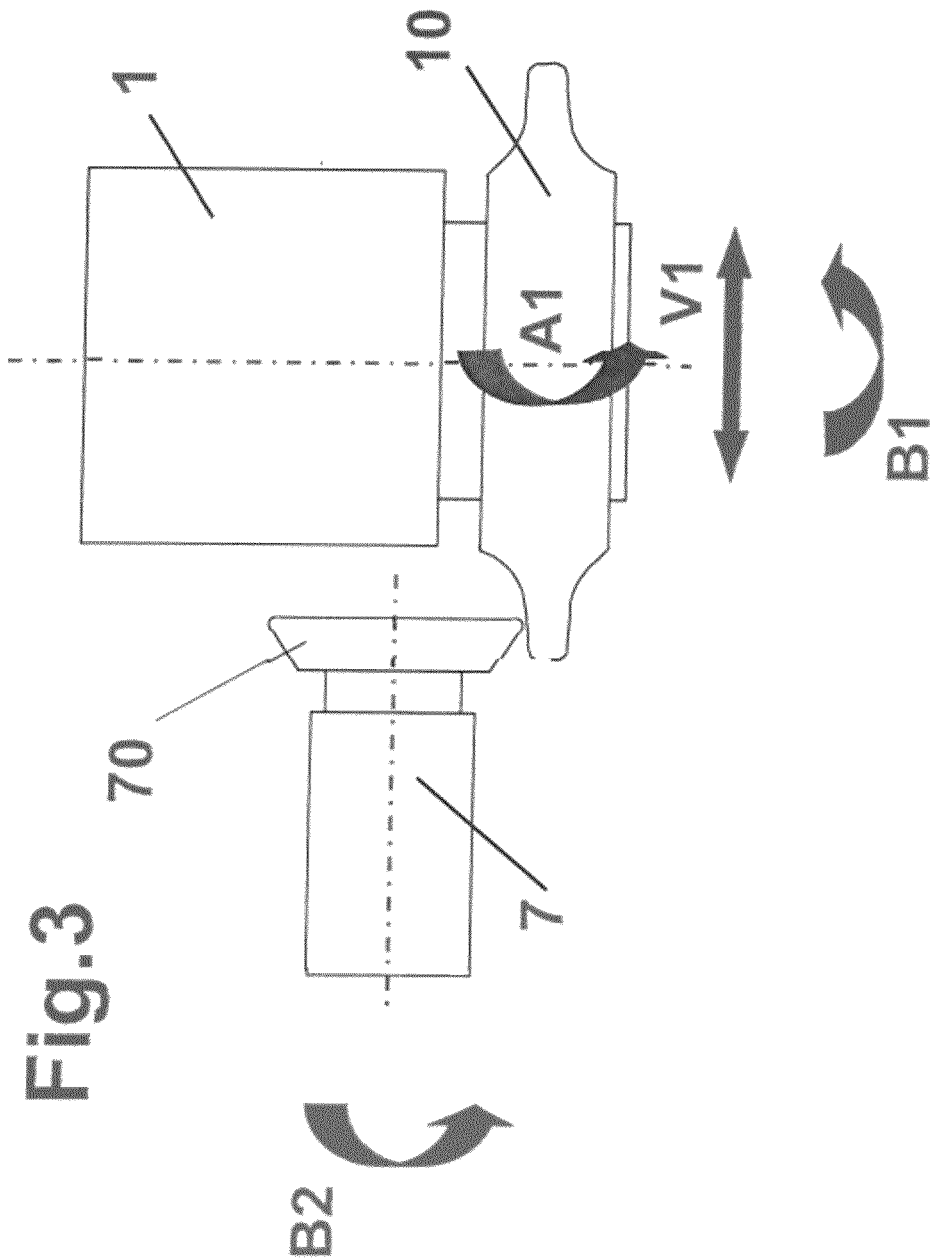

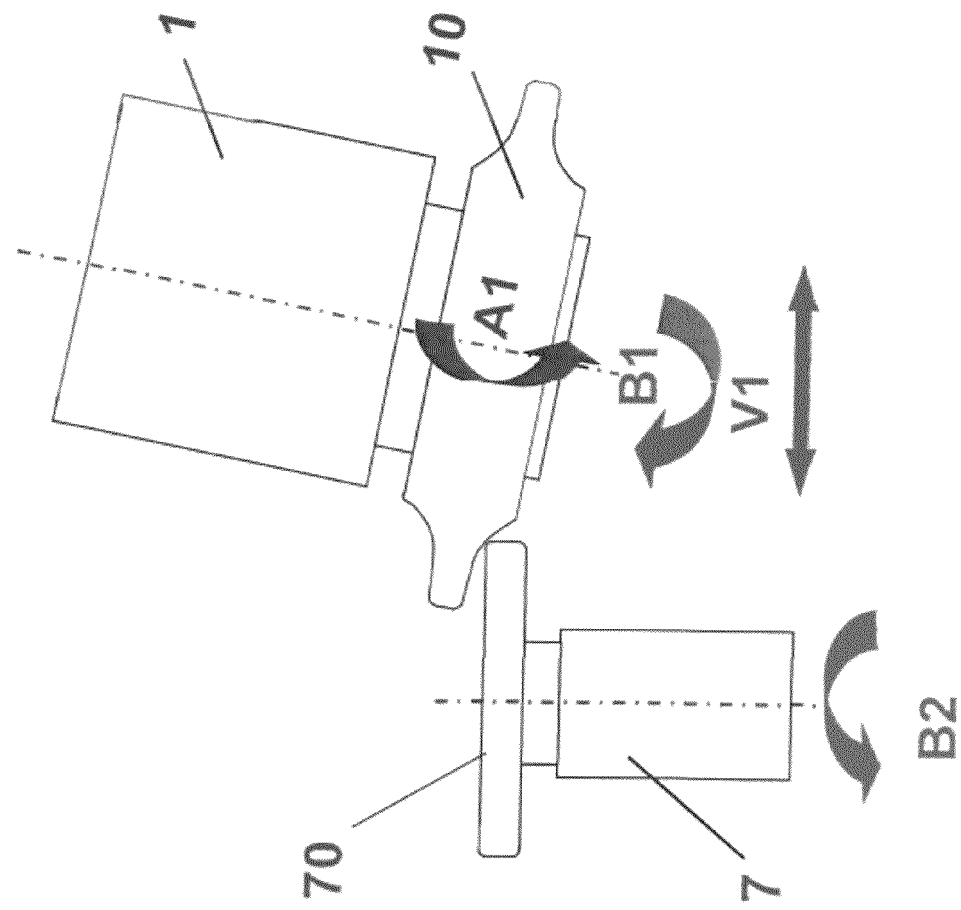

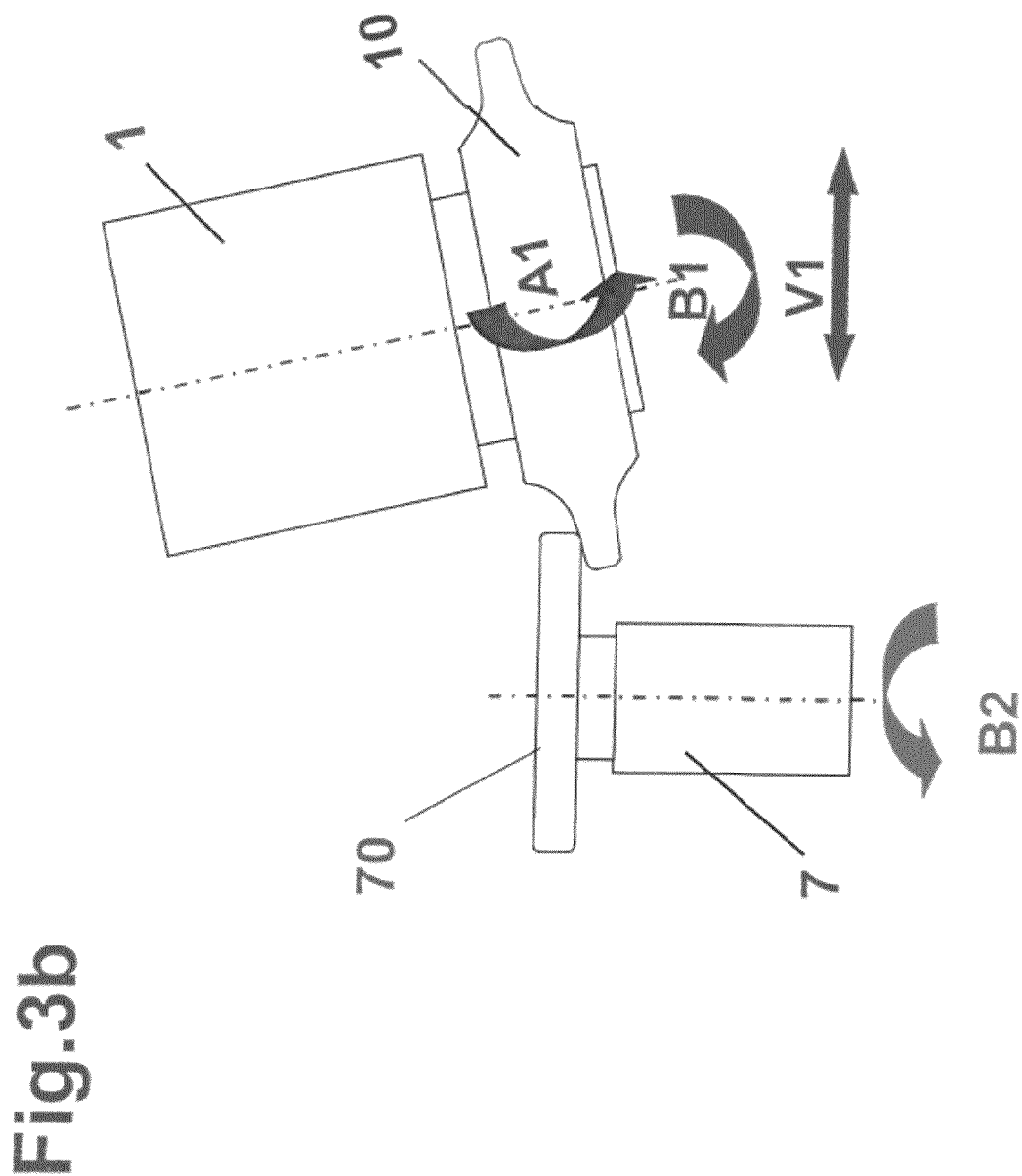

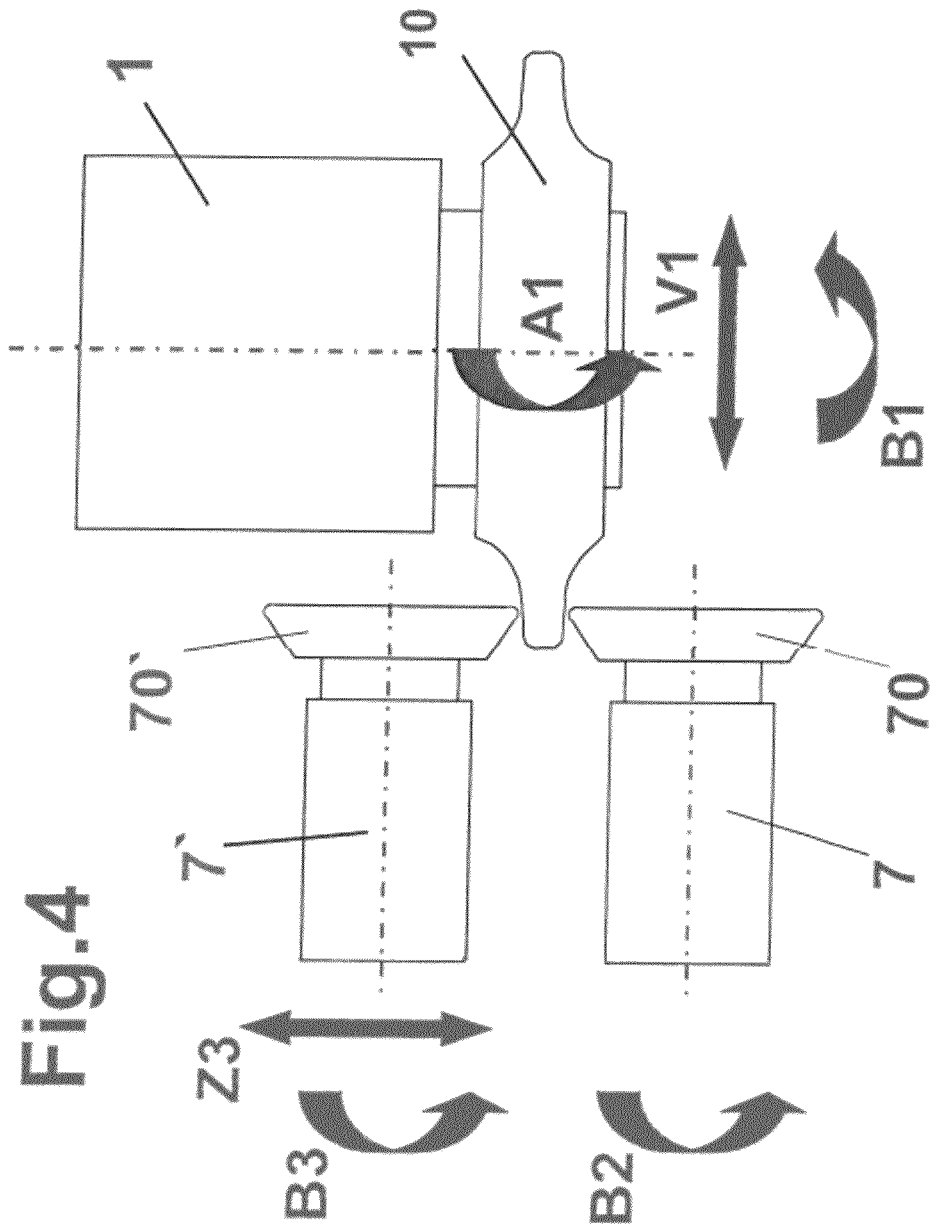

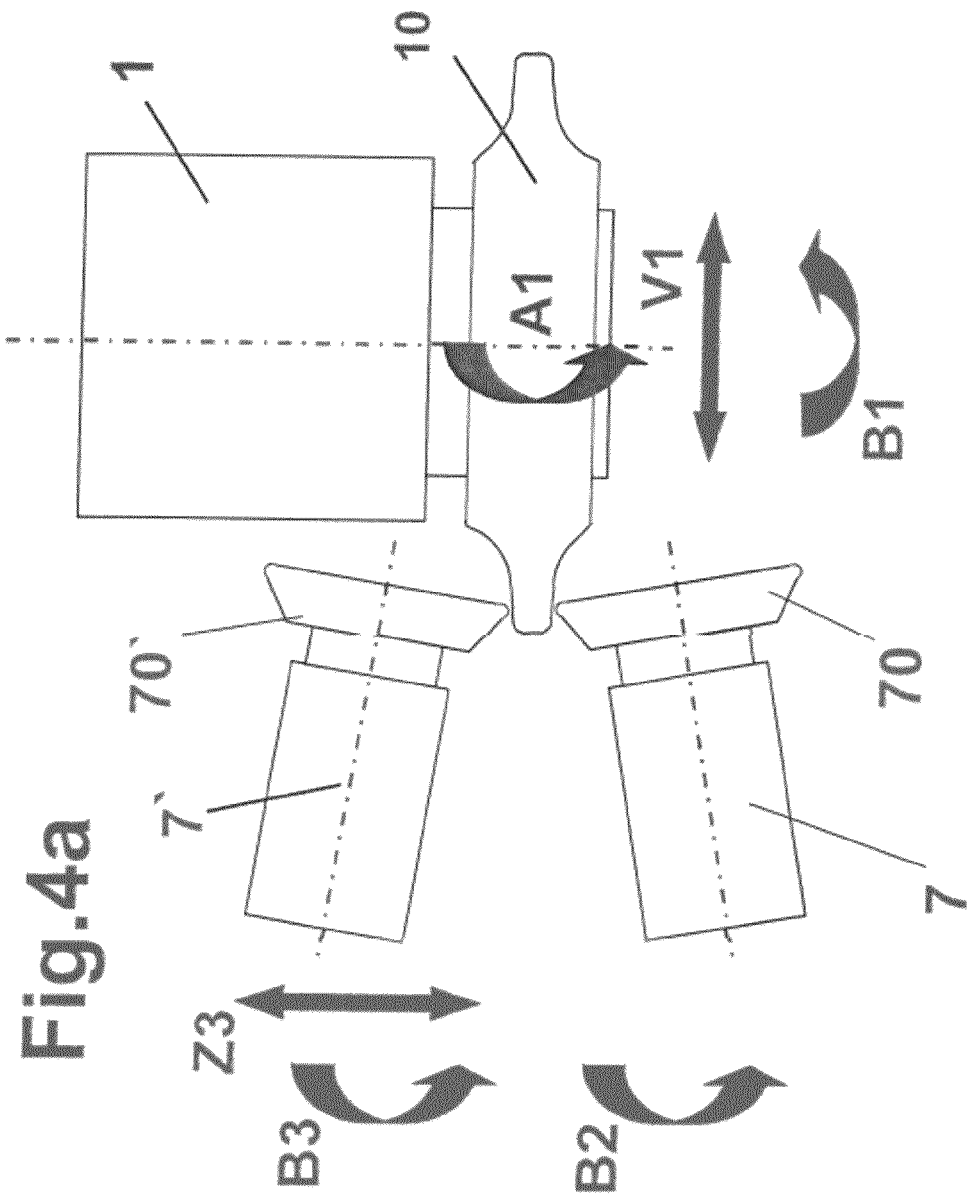

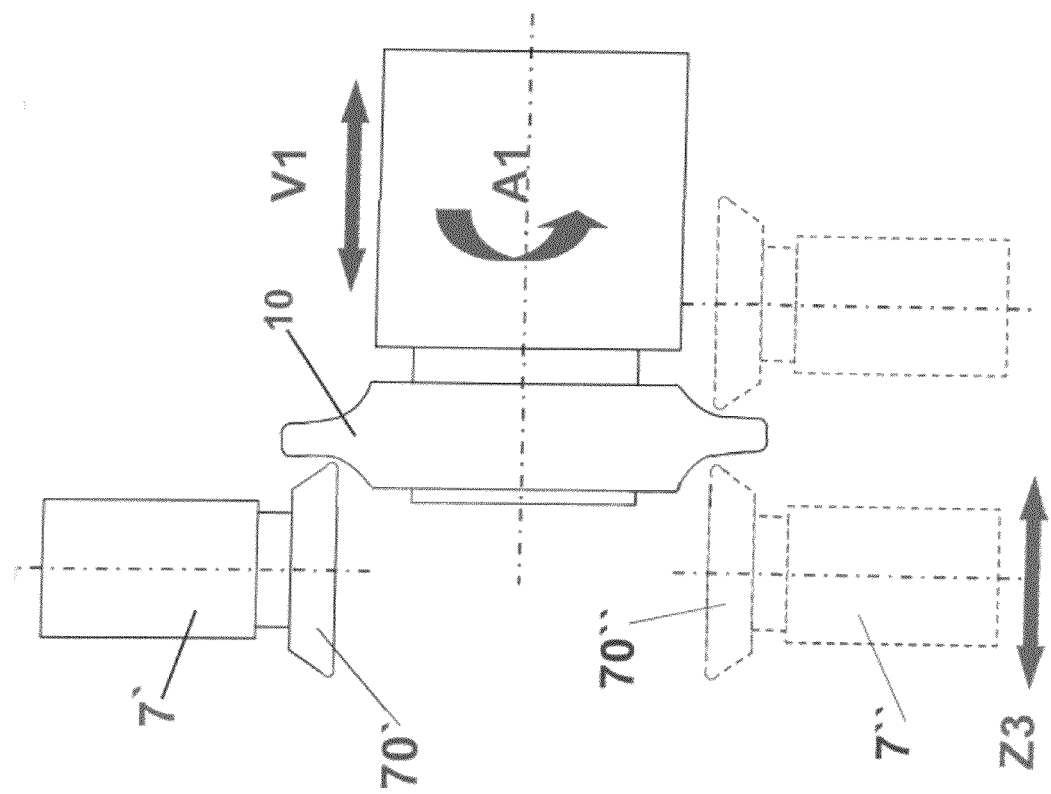

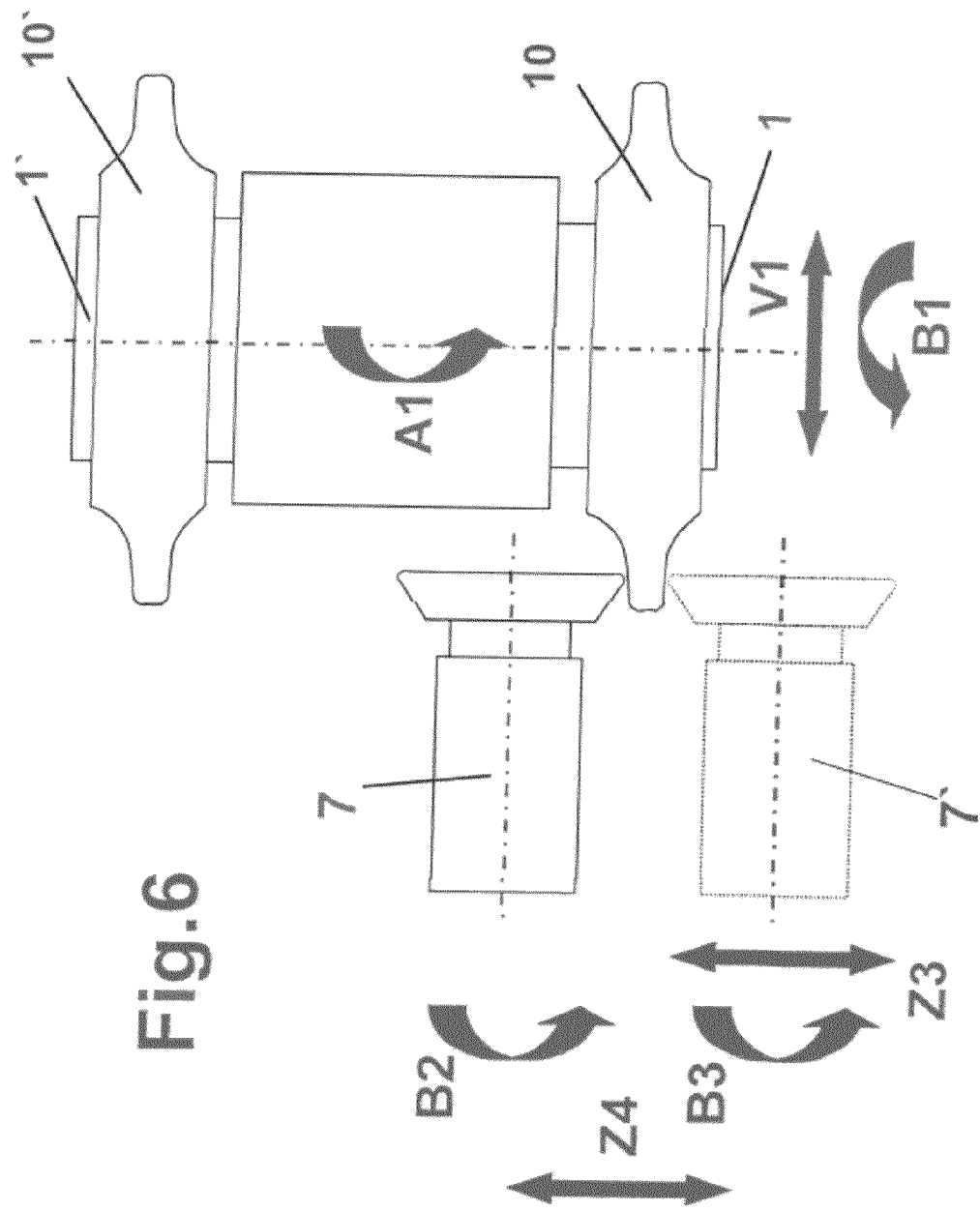

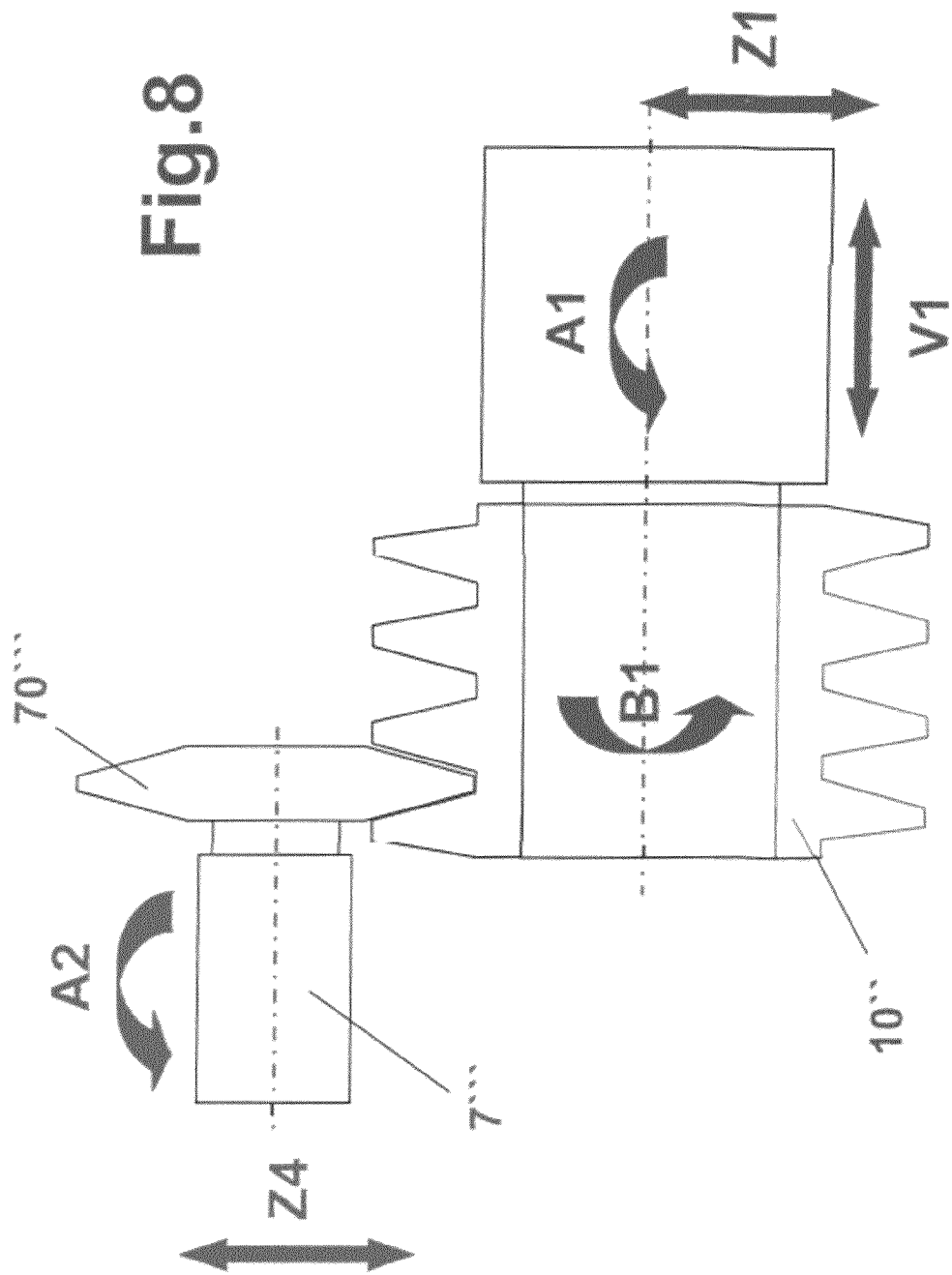

METHOD FOR DRESSING A TOOL

CROSS REFERENCE TO RELATED APPLICATION

This application claims priority to German Patent Application No. 10 2011 103 216.2, entitled "Method for Dressing a Tool," filed Jun. 1, 2011, which is hereby incorporated by reference in its entirety for all purposes.

TECHNICAL FIELD

The present disclosure relates to a method for dressing a tool on a gear grinding machine and to a gear grinding machine. The gear grinding machine includes a workpiece holder and a tool holder, wherein the workpiece holder is rotatable about a first axis of rotation (B1) and is arranged on a machining head which is pivotable via a swivel axis (A) and linearly shiftable via a shift axis (V1). A workpiece clamped in the workpiece holder can be machined by a tool clamped in the tool holder.

The gear grinding machine furthermore includes a dressing unit with a dressing tool holder which is rotatable about a second axis of rotation (B2). In the method according to the present disclosure, a dressing tool accommodated in the dressing tool holder is used for dressing a tool clamped in the tool holder.

BACKGROUND AND SUMMARY

The tools used in gear grinding are exposed to constant wear and therefore must be dressed at regular intervals. The abrasive coating of the tools consists of abrasive grains bound in a binding material, wherein during dressing a removal of abrasive grains and binding material of the tool is effected with the objective of changing the abrasive coating for generating the desired profile of the tool and the required profile accuracy (macrogeometry). The tool can be dressed by a rotating dressing tool accommodated in the dressing tool holder, while it remains clamped in the tool holder.

In the dressing method known from the prior art, a desired profile of the tool is achieved on dressing, in that the relative movements between tool and dressing tool, which are necessary for producing the desired profile, are generated by the superposition of a movement of an axis of movement of the dressing unit with a movement of an axis of movement of the machining head.

It is the object of the present disclosure to provide an improved method for dressing a tool. Furthermore, it is the object of the present disclosure to provide an improved gear grinding machine.

In accordance with the present disclosure, this object is at least partially addressed as described herein.

In one example, the present disclosure shows a method for dressing a tool on a gear grinding machine which includes a workpiece holder and a tool holder, wherein the tool holder is rotatable about a first axis of rotation (B1) and is arranged on a machining head which is pivotable via a swivel axis (A1) and is linearly movable via a first linear axis of movement (V1), wherein a workpiece clamped in the workpiece holder can be machined by a tool clamped in the tool holder. The gear grinding machine furthermore includes a dressing unit with a dressing tool holder, which is rotatable about a second axis of rotation (B2), wherein a dressing tool accommodated in the dressing tool holder is used for dressing the tool clamped in the tool holder.

In accordance with the present disclosure it is provided that during the dressing operation the machining head is pivoted and linearly moved by movements of the swivel axis (A1) and the first linear axis of movement (V1) adjusted to each other in dependence on the tool profile to be produced, wherein the relative movements between dressing tool and tool, which produce the desired profile, are at least partly generated by the superposition of the movements of the swivel axis (A1) and the first linear axis of movement (V1). The method according to the present disclosure can be used for example for producing or restoring a desired profile and/or for modifying a profile.

The inventors of the present disclosure have recognized that for generating the relative movements necessary during dressing, no axes of movement of the dressing unit must be employed. These relative movements rather can be generated via the swivel axis (A1) and the first linear axis of movement (V1) anyway present for machining a workpiece. As a result, the axes of the gear grinding machine anyway present can be used better in the method according to the present disclosure. On the one hand, this provides for a more flexible dressing operation, and on the other hand for using a gear grinding machine of simpler construction.

In accordance with the present disclosure, the desired profile of the tool is produced in that by moving the machining head via the swivel axis (A1) and the first linear axis of movement (V1), the rotating tool is guided past the likewise rotating dressing tool for producing the desired profile, while the dressing tool and tool are in engagement with each other.

Advantageously, the swivel axis (A1) of the machining head is perpendicular to the axis of rotation (B1) of the tool holder.

Furthermore advantageously, in the method according to the present disclosure the swivel axis (A1) and the first linear axis of movement (V1) also are used when machining a workpiece on the gear grinding machine.

When machining a workpiece, the swivel axis (A1) in particular can be used for adjusting the angle between the tool axis and the workpiece axis, for example when producing a helical toothing.

Furthermore, the first linear axis of movement (V1) can be used for shifting the tool, for example to bring another point of the tool in engagement with the workpiece.

In accordance with the present disclosure, the dressing unit is arranged on the gear grinding machine such that the machining head with the tool holder is movable relative to the dressing unit via a first linear axis of movement (V1). The linear axis of movement (V1) hence provides the second degree of freedom necessary for producing a desired two-dimensional profile of the tool beside the swivel axis (A1).

Advantageously, the relative movements between dressing tool and tool, which are necessary for producing the desired profile during the dressing operation, are generated solely via a movement of the machining head. In particular, the dressing unit thus can be arranged on the gear grinding machine without a linear axis of movement, and advantageously in a completely rigid manner.

For producing the desired profile, the swivel axis (A1) and/or the first linear axis of movement (V1) of the machining head in addition can furthermore be utilized in accordance with the present disclosure for moving the tool accommodated in the tool holder towards the dressing tool from a grinding position into a dressing position. In particular, the tool can be pivoted by the swivel axis (A1) from a grinding position into the dressing position.

Advantageously, the tool accommodated in the tool holder is moved towards the dressing tool solely by the movements of the machining head.

In the method according to the present disclosure or in the gear grinding machine used for this purpose, it can furthermore be provided that the workpiece holder is rotatable about a third axis of rotation (C1) and the machining head is arranged on a carriage which is movable parallel to the axis of rotation (C1) of the workpiece holder via a second linear axis of movement (Z1).

Advantageously, it can be provided that the first linear axis of movement (V1) allows a linear movement of the machining head relative to the carriage.

Furthermore advantageously, it can be provided that the swivel axis (A1) allows a swivel movement of the machining head relative to the carriage.

Furthermore, it can be provided that the first linear axis of movement (V1) is arranged between the swivel axis (A1) and the carriage. Furthermore, it can be provided that the first linear axis of movement (V1) is vertical to the second linear axis of movement (Z1).

Alternatively, however, it can also be provided that the swivel axis (A1) is arranged between the first linear axis of movement (V1) and the carriage.

Furthermore, it can be provided that the carriage is arranged on a machine column which is movable vertical to the axis of rotation (C1) of the workpiece holder via a third linear axis of movement (X1).

In accordance with the present disclosure, the dressing unit advantageously can be arranged on the carriage, wherein for dressing purposes the relative movements are generated by the axis of rotation (A1) and the first linear axis of movement (V1) arranged between the carriage and the machining head. Since these two axes of movement are sufficient for generating all movements necessary during dressing, the dressing unit can rigidly be arranged on the carriage at least as regards linear movements.

In accordance with the present disclosure, a second dressing unit furthermore can be provided, which via a fourth linear axis of movement (Z3) can be moved towards the first dressing unit and away from the same, in order to vary the distance between the dressing tools accommodated in the dressing tool holders of the first and second dressing units. In the method according to the present disclosure, it is advantageously provided that the two dressing units are used for dressing the tool on two sides.

The method according to the present disclosure also can be used in such machining heads which include two tool holders for accommodating separate tools. Advantageously, the two tools accommodated in the tool holders are dressed by at least one common dressing unit. In particular, it can be provided that after dressing the first tool, the second tool is moved to the dressing unit by swiveling the machining head about the swivel axis (A1). Advantageously, the two tool holders are arranged on a common axis of rotation (B1). Alternatively or in addition, it can be provided that the two tool holders are driven via a common drive.

In addition to the method for dressing a tool according to the present disclosure, the present disclosure furthermore comprises a method for manufacturing a gear wheel on a gear grinding machine, in which a workpiece clamped in a workpiece holder is machined by a tool clamped in the tool holder. In particular, hard finishing of the workpiece is effected by the tool clamped in the tool holder. In accordance with the present disclosure, the tool is dressed according to the method of the present disclosure as described above, in order to produce the tool profile necessary for generating the desired workpiece geometry. The method of the present disclosure for dressing the tool thus allows a particularly flexible, easy and inexpensive manufacture of gear wheels with a desired gear wheel geometry and surface quality.

The present disclosure furthermore comprises a gear grinding machine with a controller, for example, with memory including instructions, for automatically actuating the axes of movement of the gear grinding machine while machining a workpiece and/or while dressing a tool. In accordance with the present disclosure, the controller includes structure for carrying out the above-described methods for dressing a tool. During the dressing operation, the controller advantageously controls the relative movements necessary for producing a desired profile of the tool by correspondingly pivoting the machining head via the swivel axis (A1) and by a linear movement adjusted thereto of the first linear axis of movement (V1). Advantageously, the controller calculates the swivel movements of the machining head necessary for producing a desired profile. Furthermore advantageously, the controller has an input function for inputting data on the desired profile of the tool, from which the relative movements are calculated. Advantageously, the controller is configured such that the dressing function automatically actuates the axes of the gear grinding machine when carrying out the method and steps described above.

In particular, the gear grinding machine furthermore is constructed such as has been described above with respect to the method. In particular, the gear grinding machine includes a tool holder which is rotatable about a first axis of rotation (B1) and is arranged on a machining head which is pivotable via a swivel axis (A1). Furthermore, the gear grinding machine includes a dressing unit with a dressing tool holder, which is rotatable about a second axis of rotation (B2). Furthermore, the machining head with the tool holder can be movable relative to the dressing unit via a first linear axis of movement (V1). Furthermore, the workpiece holder can be rotatable about a third axis of rotation (C1) and the machining head can be arranged on a carriage which is movable parallel to the axis of rotation (C) of the workpiece holder via a second linear axis of movement (Z1). Furthermore, it can be provided that the carriage is arranged on a machine column which is movable vertical to the axis of rotation (C1) of the workpiece holder via a third linear axis of movement (X1). The further construction of the gear grinding machine also can be designed such as has already been described above.

As in the gear grinding machine according to the present disclosure the relative movements between tool and dressing tool are generated during dressing via the first axis of rotation (A1) of the machining head and a further linear axis of movement of the machining head, the dressing unit itself need not have any axes of movement. In accordance with the present disclosure, the dressing unit therefore can rigidly be arranged on an element anyway present in the gear grinding machine, at least as regards linear movements, for example on the carriage or the machine column on which the carriage is arranged. In a particularly advantageous way, the dressing unit is rigidly arranged on the carriage which carries the machining head of the gear grinding machine, at least as regards linear movements.

Therefore, the present disclosure furthermore comprises a gear grinding machine with a workpiece holder and a tool holder, wherein the workpiece holder is rotatable about a third axis of rotation (C1), wherein the tool holder is rotatable about a first axis of rotation (B1) and is arranged on a machining head which is pivotable via a swivel axis (A1), wherein a workpiece clamped in the workpiece holder can be machined by a tool clamped in the tool holder, and wherein the machining head is arranged on a carriage which is movable parallel to the third axis of rotation (C1) via a second linear axis of movement (Z1). The gear grinding machine furthermore includes a dressing unit with a dressing tool holder which is rotatable about a second axis of rotation (B2), so that a dressing tool accommodated in the dressing tool holder is usable for dressing a tool clamped in the tool holder. In accordance with the present disclosure it is provided that the dressing unit is rigidly arranged on the carriage which carries the machining head of the gear grinding machine, at least as regards linear movements. Such gear grinding machine has a particularly simple construction, wherein dressing the tool clamped in the tool holder nevertheless is possible by the dressing unit according to the method of the present disclosure.

Advantageously, the machining head with the tool holder is movable relative to the carriage via a first linear axis of movement (V1), so that for dressing purposes relative movements with two different degrees of freedom between the tool holder and the dressing tool holder can be generated by means of the swivel axis (A1) and the first linear axis of movement (V1).

Advantageously, the gear grinding machine according to the present disclosure includes a controller for automatically actuating the axes of movement of the gear grinding machine while machining a workpiece and/or while dressing a tool. Advantageously, this controller has a function for carrying out a method according to the present disclosure, as it has already been described above.

Advantageously, the gear grinding machine furthermore is constructed such as has already been described above.

Furthermore, the carriage can be arranged on a machine column which is movable vertical to the axis of rotation (C1) of the workpiece holder via a third linear axis of movement (X1).

Furthermore, a second dressing unit can be provided, which via a fourth linear axis of movement (Z3) can be moved towards the first dressing unit and away from the same, in order to vary the distance between the dressing tools to be accommodated in the dressing tool holders of the first and second dressing units. This can be used in particular for dressing a tool on two sides. The axes of rotation of the two dressing units need not necessarily be aligned in parallel. This is the case, however, in an exemplary embodiment.

Advantageously, the above-described method also is carried out for dressing a tool on the gear grinding machine described above.

Independent of the gear grinding machine described so far and the method described so far, the present disclosure may also comprise a gear grinding machine with a workpiece holder and two tool holders for accommodating separate tools, wherein the tool holders each are rotatable about an axis of rotation and are arranged on a common machining head which is pivotable via a swivel axis (A1), wherein a workpiece clamped in the workpiece holder can be machined by tools clamped in the tool holders. In accordance with the present disclosure, it is provided that the two tool holders are arranged on sides of the machining head facing away from the swivel axis (A1). Other than in known double grinding heads, the two tool holders are not oriented towards the common swivel axis (A1) of the machining head, but each point away from the same. As a result, the tools can be mounted on the tool holders more easily and in addition have a greater distance from the swivel axis (A1). This provides advantages both in terms of machining the workpiece alternately by the two tools and in terms of dressing the tools.

Advantageously, the two tool holders are arranged on opposite sides of the machining head. In particular, it can be provided that the tool holders are arranged on one common axis of rotation (B1) or on parallel axes of rotation. Furthermore, it can be provided that the two tool holders are driven via a common drive.

Furthermore advantageously, the two tools accommodated in the tool holders can be dressed by means of at least one common dressing unit. Advantageously, after dressing the first tool, the second tool can be moved to the dressing unit by swiveling the machining head about the swivel axis (A1).

In the machining head with two tool holders according to the present disclosure, two tools can thus be used with only a small additional effort. In particular, two different tools can be arranged on the grinding head, for example tools with abrasive material with different degrees of fineness. Thus, the first tool for example can be used for roughing, while the second tool is used for finishing. By a corresponding adaptation of the grain size to the respective machining operation, an improvement of performance thus is obtained, since a coarse grain can be used for roughing and a fine grain for finishing.

The last gear grinding machine described can be constructed such as has already been described above in detail with respect to the previously described gear grinding machines. In particular, the machining head with the tool holders can be movable relative to the dressing unit via a first linear axis of movement (V1). Furthermore, the workpiece holder can be rotatable about a third axis of rotation (C1) and the machining head can be arranged on a carriage which is movable parallel to the axis of rotation (C) of the workpiece holder via a second linear axis of movement (Z1). Furthermore, it can be provided that the carriage is arranged on a machine column which is movable vertical to the axis of rotation (C1) of the workpiece holder via a third linear axis of movement (X1).

The gear grinding machine likewise can include a controller as it has already been described above. Furthermore, the above-described method also can be carried out for dressing a tool on the gear grinding machine described above.

In the present disclosure, in particular, grinding wheels and/or grinding worms can be employed as tools. The tools advantageously consist of abrasive grains connected with each other. Dressing the tools is effected by removing grain and binding the grinding tool with the objective of changing the abrasive coating for producing a desired profile and the required profile accuracy. In particular, abrasive grains of corundum, CBN or silicon carbide can be used.

As dressing tools, dressing wheels are advantageously employed. In particular, such dressing wheel can be a diamond wheel or a hard-material-coated metal base body.

The present disclosure will now be explained in detail with reference to drawings and exemplary embodiments.

BRIEF DESCRIPTION OF THE FIGURES

FIG. 1 shows a first exemplary embodiment of a gear grinding machine according to the present disclosure with a dressing unit.

FIG. 2 shows a second exemplary embodiment of a gear grinding machine according to the present disclosure with two dressing units.

FIG. 2a shows a third exemplary embodiment of a gear grinding machine according to the present disclosure with two dressing units and a machining head for machining internal toothings.

FIG. 3 shows a schematic diagram of a first exemplary embodiment of a method according to the present disclosure.

FIGS. 3a and 3b show a schematic diagram of a modified first exemplary embodiment of a method according to the present disclosure, in which another arrangement of the dressing unit is employed than in FIG. 3.

FIG. 4 shows a schematic diagram of a second exemplary embodiment of a method according to the present disclosure, in which two dressing units are employed.

FIG. 4a shows a schematic diagram of a third exemplary embodiment of a method according to the present disclosure, in which there are also used two dressing units whose axes, however, are not arranged parallel to each other.

FIG. 5 shows a schematic diagram of a fourth exemplary embodiment of a method according to the present disclosure.

FIG. 6 shows an exemplary embodiment of a gear grinding machine with two tool holders arranged on the grinding head and an exemplary embodiment of a corresponding method for dressing.

FIG. 8 shows a further exemplary embodiment of a method according to the invention, in which further degrees of freedom of the gear grinding machine are used for producing complex profiles.

DETAILED DESCRIPTION

Figure 7:
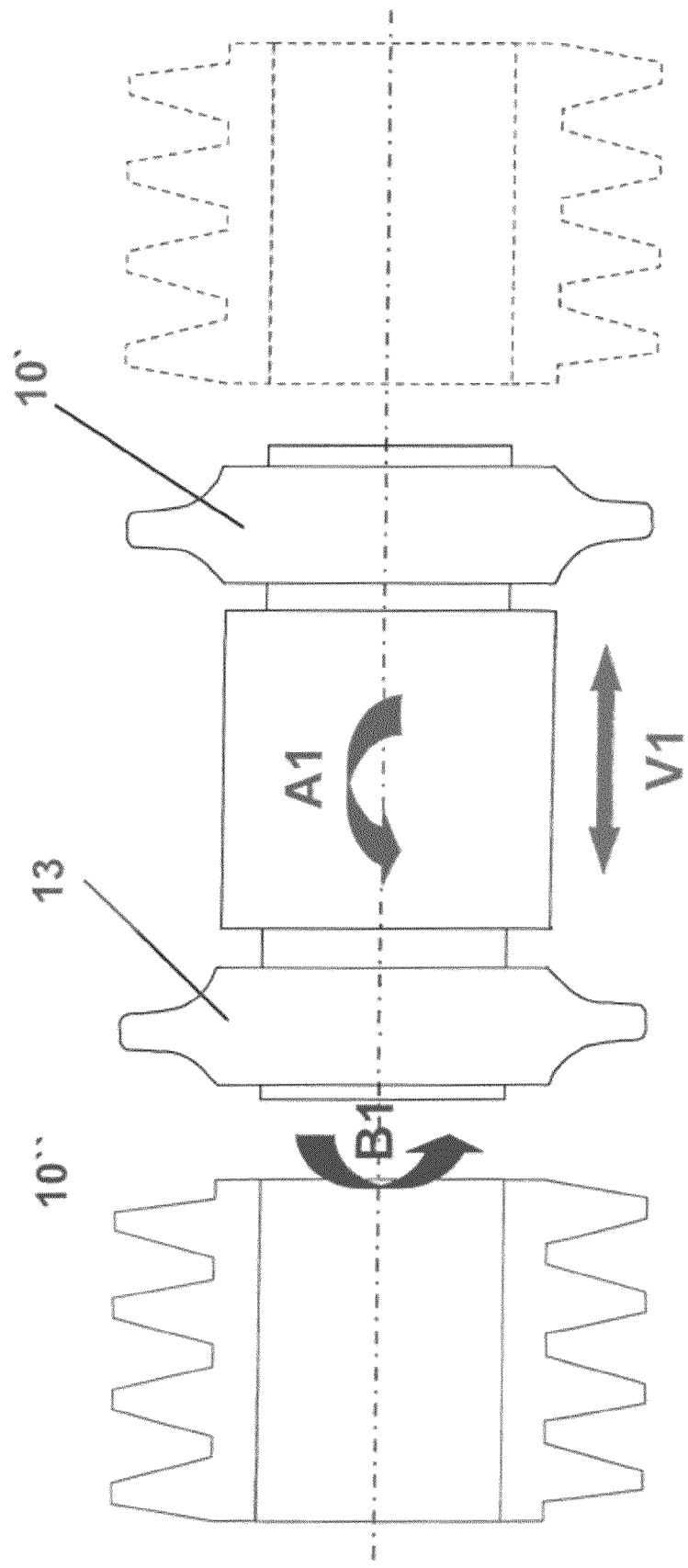
FIG. 7 shows a further exemplary embodiment of a gear grinding machine according to the present disclosure with two tool holders arranged on the machining head.

FIG. 1 shows a first exemplary embodiment of a gear grinding machine according to the present disclosure. The same includes a workpiece holder 2 for accommodating a non-illustrated workpiece and a workpiece clamping device. The workpiece holder is rotatable about an axis of rotation (B1), for which purpose a corresponding drive is provided.

The gear grinding machine furthermore includes a tool holder 1 for accommodating a tool 10. The tool is a grinding tool by means of which a workpiece arranged in the workpiece holder can be machined. In particular, the tool can be used for hard finishing the workpiece. For this purpose, the tool holder with the tool 10 is rotatable about an axis of rotation (B1) by means of a drive 16.

The tool holder 1 is arranged on a machining head 20 which is movable relative to the workpiece holder 2 via a plurality of axes of movement of the gear grinding machine. The axes of movement (Z1, V1, A1) allow the relative movements between the tool 10 and the workpiece, which are necessary for machining the workpiece during the grinding operation. In the exemplary embodiment, the tool 10 is a grinding wheel. Alternatively, a grinding worm would also be conceivable.

The machining head 20 is pivotable about a swivel axis (A1). While machining a workpiece arranged in the workpiece holder 2, the swivel axis (A1) allows to adjust the setting angle of the tool relative to the workpiece, in order to produce e.g. helical toothings. The swivel axis (A1) is arranged parallel to the infeed axis (X1) of the tool.

Via a second linear axis of movement (Z1), the machining head 20 furthermore is shiftable in a direction parallel to the axis of rotation (C1) of the workpiece holder 2. For this purpose, a guideway 17 is provided, on which a carriage 18 is arranged, which carries the machining head 20. The axis of movement (Z1) is arranged on a machine column 8, which in turn can be moved radially to the axis of rotation (C1) of the workpiece holder via a linear axis of movement (X1).

For moving the carriage in the Z1-direction, a ball screw 15 as well as a drive 12 are provided in the exemplary embodiment. For moving the machine column 18, a ball screw 13 and a corresponding drive 14 in turn are provided. Via a corresponding guideway, the machine column 8 is shiftably mounted on a machine bed 9, on which the workpiece holder 2 also is arranged. Alternatively, the workpiece holder 2 also might be arranged on the machine bed 9, so as to be shiftable in the X1-direction.

Via the first and the second linear axes of movement (V1) and (Z1), the machining head 20 is movable in a plane tangential to the axis of rotation (C1). In the exemplary embodiment shown here, the first axis of movement (V1) is arranged directly on the carriage which is movable in the Z1-direction. The second linear axis movement (Z1) is vertical to the first linear axis of movement (V1). The first linear axis of movement (V1) is arranged between the carriage 18 and the swivel axis (A1).

In an alternative exemplary embodiment, the axis of rotation (A1) also might be arranged between the carriage 18 and the first linear axis of movement (V1). In particular, the first linear axis of movement (V1) might be arranged parallel to the axis of rotation (B1) of the machining head and provide for a displacement of the tool in a direction of its axis of rotation (B1).

Furthermore, a dressing unit 7 is provided, which includes a dressing tool holder rotatable about an axis of rotation (B2). In this way, the dressing tool 70 accommodated therein can be rotated via a corresponding drive of the dressing unit.

Dressing the tool 10 by the dressing tool 70 is effected by rotating both the tool 10 and the dressing tool 70 about their respective axes of rotation, in order to provide for a corresponding removal of material, with the desired profile of the tool 10 being effected by a relative movement between dressing unit 7 and machining head 20 via axes of movement of the gear grinding machine.

In accordance with the present disclosure it therefor is provided that during the dressing operation the machining head is pivoted about the swivel axis (A1) in dependence on the tool profile to be produced and is linearly moved via the first linear axis of movement (V1), so that the relative movements between dressing tool and tool, which are necessary for producing the desired profile, are generated by the superposition of the movement of the swivel axis (A1) and the first linear axis of movement (V1).

In particular, it can be provided that all relative movements necessary for producing desired profiles are generated via these two axes.

As is illustrated in the exemplary embodiment, this provides for rigidly arranging the dressing unit 7 on the carriage 18 of the gear grinding machine. In the exemplary embodiment, the dressing unit 7 is arranged on the carriage 18 laterally beside the machining head 20. In the exemplary embodiment, the axis of rotation (B2) of the dressing unit 7 extends vertically. This orientation is, however, not absolutely necessary. Alternatively, e.g. an arrangement of the dressing unit 7 with horizontal or inclined axis of rotation (B2) would also be conceivable.

FIG. 1 shows the exemplary embodiment of the gear grinding machine according to the present disclosure in a grinding position in which the axis of rotation (B1) is arranged by a corresponding adjustment of the A1-axis in dependence on the helix angle of the toothing to be produced. The tool 10 is arranged at a distance from the dressing tool 70. For dressing purposes, the machining head then can be shifted into a dressing position via the axes V1 and A1, in which dressing position the dressing tool 70 gets in engagement with the tool 10.

FIG. 1 also shows a controller 50 receiving information via inputs 52, which may include sensors and/or user inputs, and sending control signals to actuators 54, which may correspond to the actuators of the various axes in FIG. 1, for example.

FIG. 2 shows a second exemplary embodiment of a gear grinding machine according to the present disclosure, which in the construction of the gear grinding machine corresponds to the exemplary embodiment shown in FIG. 1. The same components and axes shown in FIG. 2, that are also shown in FIG. 1, are not labeled again in FIG. 2 for improved readability. Similarly, the same applies for FIG. 2a with respect to FIG. 1. Additionally, a controller and associated inputs and outputs, such as shown in FIG. 1, may also included in the systems of FIGS. 2 and 2a. FIGS. 1, 2, and 2a are drawing approximately to scale, although other scales may be used. Further, FIG. 1 shows axis labeled longitudinal, lateral, and vertical, although other labels may be used. In FIG. 1, axis X1 and rotational axis A1 are longitudinal, axis Z1 and rotational axes B2 and C1 are vertical, and rotational axes B1 and axis V1 are lateral, in this example.

Continuing with FIG. 2, on the carriage 18, two dressing units 7 and 7' are arranged, which provide for dressing the grinding wheel 10 on both sides. For this purpose, at least one of the two dressing units 7 and 7' is movable towards the other dressing unit via a linear axis movement (Z3), so as to be able to adjust the distance between the two dressing tools. Alternatively, both dressing units 7 and 7' might also each be movable via separate, in particular parallel linear axes of movement.

The third exemplary embodiment of a gear grinding machine according to the present disclosure as shown in FIG. 2a substantially corresponds to the exemplary embodiment shown in FIG. 2, but is equipped with a machining head for machining an internal toothing. The machining head includes an arm 11 on which the tool holder 1 is arranged for accommodating the tool 10. The arm 11 ensures that the tool 10 can be moved into an internal toothing arranged below the machining head.

The gear grinding machine according to the present disclosure furthermore includes a controller by which the NC axes of the gear grinding machine can be actuated in an automated manner. In particular, the controller has a function by which a dressing method according to the present disclosure can be carried out. In particular, the controller actuates the A1-axis and the V1-axis during the dressing operation for producing the desired profile.

As an alternative to the exemplary embodiments shown in FIGS. 1 and 2, in which the dressing units are arranged on the carriage 18 and the relative movements for producing the desired profile on dressing are generated via the A1- and V1-axes, the dressing unit might also be arranged on the machine column. As a result, the Z1-axis additionally would be available for relative movements between the dressing unit and the machining head. In accordance with the present disclosure, beside a movement of the machining head about the A1-axis, relative movements might additionally be effected during the dressing operation by a movement of the machining head via the V1-axis and/or the Z1-axis. As a result, more complex profiles possibly might also be produced.

Alternatively or in addition it might also be provided that the dressing unit includes a swivel axis, so that a further degree of freedom is available during dressing. It might also be provided that the dressing unit is shiftable via a linear axis of movement, e.g. in Z4-direction.

FIG. 3 shows a first exemplary embodiment of a method according to the present disclosure for dressing a tool 10 by a dressing tool 70. The axis of rotation B2 of the dressing unit 7 is oriented horizontally, the B1-axis of the machining head 20 substantially vertically. The V1-axis allows to guide the tool 10 along the dressing tool 70 in horizontal direction according to the desired profile. By pivoting the machining head 20 about the A1-axis, a movement in a vertical direction now can be generated in addition, so that it is possible to produce a two-dimensional profile. The movement in horizontal direction generated in addition on pivoting the machining head, then must be compensated by a corresponding counter-movement of the V1-axis.

Due to the superposition of the swivel movement via the A1-axis and the linear movement via the V1-axis, it thus is possible to produce arbitrary two-dimensional profiles.

FIGS. 3a and 3b show an alternative exemplary embodiment of a method according to the present disclosure, in which the arrangement of the dressing unit shown in FIG. 1 is used, i.e., a dressing unit whose axis of rotation B2 is oriented vertically. In FIG. 3a it is shown how by shifting the machining head about the B1- and V1-axes the desired profile first is produced on one side of the tool 10 by guiding this side along the dressing tool 70. In FIG. 3b, the desired profile then is analogously produced on the other side of the tool 10.

FIG. 4 shows a second exemplary embodiment of a method according to the present disclosure, in which a second dressing unit 7' with a second dressing tool 70' is employed. The second dressing unit 7' has an axis of rotation B3, about which the dressing tool 70' can be rotated. The second dressing unit 7' is linearly shiftable about a linear axis Z3, so that the distance between the two dressing tools 70 and 70' can be adjusted. This provides for machining the tool 10 on both sides. The distance between the two dressing tools 70 and 70' is adjusted to the desired thickness of the tool 10 in the respective engagement position, whereas all other relative movements between tool 10 and dressing tools 70 and 70' are effected via the V1- and A1-axes.

In the exemplary embodiment shown in FIG. 4, the axes of rotation B2 and B3 of the two dressing units extend in parallel, while the linear axis of movement Z3 is vertical to these two axes of rotation. Alternatively, the two axes of rotation B2 and B3 also can extend at an angle to each other, as is shown in FIG. 4a. Alternatively, the axis of rotation B2 might also be vertical to the axis of rotation B3.

During dressing, as an alternative to the arrangement shown in FIGS. 3 and 4, the axis of rotation B2 of the dressing unit 7 might also be arranged substantially parallel to the axis of rotation B1 of the tool 10. In this case, too, the desired profile might be produced by a superposition of the movements of the V1-axis and of the A1-axis.

Furthermore, as shown in FIG. 5, the dressing operation can also be effected with an orientation of the axis of rotation B1 substantially parallel to the linear axis of movement V1. Here again, dressing the grinding wheel 10 on two sides of course also is possible, as is shown at the bottom in broken lines.

FIGS. 6 and 7 now show an exemplary embodiment of the second aspect of the present disclosure, and in FIG. 6 the same is combined with the first aspect.

There is provided a machining head which includes two tool holders 1 and 1'. The two tool holders are arranged on opposite sides of the machining head or of the swivel axis A1 with their active surfaces to the outside.

In the exemplary embodiment, the arrangement of the two tool holders is coaxial. The two tool holders can be drivable via a common drive or each via separate drives.

In the two tool holders, a first tool 10 and a second tool 10' are arranged. The first tool 10 can have a coarser grain than the second tool 10'. In particular, the first tool 10 can be used for roughing and the second tool 10' for finishing.

The first and the second tool each can be grinding wheels. Alternatively, the first and/or the second tool also can be a grinding worm 10', as is shown in FIG. 7.

The two tools 10 and 10' thus can be used one after the other for machining a workpiece in different machining steps. Alternatively, it is also conceivable to dress the one tool, while a workpiece is machined with the other tool. In this case, it is also possible to use two identical tools. FIG. 6 shows a combination of the second aspect with the first aspect of the present disclosure, i.e. a combination of the machining head with the two tool holders with a dressing unit 7 rigidly arranged on the carriage. For dressing the first tool 10 or the second tool 10', the machining head each can be pivoted about the swivel axis A1 such that the respective tool to be dressed gets in engagement with the dressing tool. The relative movement between dressing tool and tool, which is necessary for producing the desired profile, then can again be obtained via the V1- and A1-axes.

As is likewise shown in FIG. 6, a second dressing unit 7' can also be used here, in order to be able to dress the respective tools on both sides.

Alternatively, it would be conceivable to render both dressing units movable via a linear axis of movement, or to render the two dressing units 7 and 7' jointly movable via a further Z4-axis.

The machining head with two tool holders according to the present disclosure as shown in FIGS. 6 and 7 advantageously is arranged on a gear grinding machine as it has already been described in detail with respect to FIGS. 1 and 2. In particular, the machining head can be pivoted via an at least one swivel axis A1 and be moved tangentially to the workpiece via two linear axes.

FIG. 8 shows a further exemplary embodiment of the present disclosure, in which a grinding worm is used as tool 10". If a grinding worm 10" corrected in terms of its engagement angle is to be used, more than two degrees of freedom are required for dressing. In accordance with the present disclosure, it can therefore be provided that during dressing two further degrees of freedom are employed in addition to pivoting the machining head about the A1-axis.

In a first exemplary embodiment, the Z1-axis also can be used beside the V1-axis. For this purpose, the dressing unit 7''' is not arranged on the carriage 18, but on the machine column.

Alternatively or in addition, the dressing unit 7''' itself also can be pivotable about a swivel axis A2. Advantageously, the swivel axis A2 is vertical to the axis of rotation of the dressing unit 7'''.

Alternatively or in addition, the dressing unit 7''' itself also can be designed linearly shiftable via a Z4-axis.

The exemplary embodiments of the gear grinding machine according to the present disclosure advantageously each include a controller for actuating the respective axes of movement, wherein the controller has a function for automatically carrying out the methods described above.

The invention claimed is:

1. A method for dressing a tool of a gear grinding machine which includes a workpiece holder and a tool holder,
    wherein the tool holder is rotatable about a first axis of rotation and is arranged on a machining head which is pivotable via a swivel axis and is linearly movable via a first linear axis of movement,
    wherein a workpiece clamped in the workpiece holder is machinable by a tool clamped in the tool holder,
    wherein the gear grinding machine furthermore includes a dressing unit with a dressing tool holder which is rotatable about a second axis of rotation, the dressing unit rigidly arranged on a carriage on which the machining head is arranged,
    wherein a dressing tool accommodated in the dressing tool holder is used for dressing the tool clamped in the tool holder, comprising: during a dressing operation, pivoting the machining head about the swivel axis and linearly moving the machining head along the first linear axis of movement in dependence on a tool profile to be produced, wherein relative movements between the dressing tool and the tool during the dressing operation, which produce a desired profile, are generated by a superposition of movements of the tool about the swivel axis and movements of the tool along the first linear axis of movement, and wherein the relative movements between the dressing tool and the tool are solely generated by a movement of the machining head.

2. The method according to claim 1, wherein the swivel axis and/or the first linear axis of movement of the machining head furthermore is utilized for moving the tool accommodated in the tool holder towards the dressing tool from a grinding position into a dressing position.

3. The method according to claim 1, wherein the tool accommodated in the tool holder solely is moved towards the dressing tool by movements of the machining head.

4. The method according to claim 1, wherein the workpiece holder is rotatable about a third axis of rotation and the carriage is movable parallel to the third axis of rotation via a second linear axis of movement.

5. The method according to claim 4, wherein the first linear axis of movement allows a linear movement of the machining head relative to the carriage and/or the swivel axis allows a swivel movement of the machining head relative to the carriage and/or
    wherein the first linear axis of movement is arranged between the swivel axis and the carriage or the swivel axis is arranged between the first linear axis of movement and the carriage and/or
    wherein the first linear axis of movement is vertical to the second linear axis of movement and/or
    wherein the carriage is arranged on a machine column which is shiftable vertical to the third axis of rotation via a third linear axis of movement.

6. The method according to claim 1, wherein a second dressing unit is provided, which via a fourth linear axis of movement is moveable towards the first dressing unit and away from the same, in order to vary a distance between the dressing tools accommodated in the dressing tool holders of the first and second dressing units, wherein the first dressing unit is configured to dress a first side of the tool and the second dressing unit is configured to dress a second side of the tool.

7. The method according to claim 6, wherein the first and second dressing units are jointly movable via a fifth linear axis of movement.

8. The method according to claim 1, wherein the machining head includes two tool holders for accommodating separate tools, which are arranged on a common axis of rotation and/or are driven via a common drive, wherein the two tools accommodated in the two tool holders are dressed by at least one common dressing unit, wherein the two tool holders are arranged on opposite sides of the machining head, and wherein after dressing the first tool, the second tool is moved towards the dressing unit by swiveling the machining head about the swivel axis.

9. A method for manufacturing a gear wheel on a gear grinding machine, in which a workpiece clamped in a workpiece holder is machined by a tool clamped in a tool holder, wherein dressing of the tool is effected by a method for dressing the tool,
    wherein the tool holder is rotatable about a first axis of rotation and is arranged on a machining head which is pivotable via a swivel axis and is linearly movable via a first linear axis of movement, wherein the gear grinding machine furthermore includes a dressing unit with a dressing tool holder which is rotatable about a second axis of rotation, the dressing unit rigidly arranged on a carriage on which the machining head is arranged, wherein a dressing tool accommodated in the dressing tool holder is used for dressing the tool clamped in the tool holder, comprising: during a dressing operation, pivoting the machining head about the swivel axis in dependence on a tool profile to be produced and linearly moving the machining head with the first linear axis of movement, wherein relative movements between the dressing tool and the tool, which produce a desired profile, are generated by a superposition of the movements of the swivel axis and of the first linear axis of movement, and wherein the relative movements between the dressing tool and the tool are solely generated by a movement of the machining head.

10. A gear grinding machine with a controller for automatically actuating axes of movement of the gear grinding machine while machining a workpiece and/or while dressing a tool, wherein the controller includes memory with instructions for dressing a tool of the gear grinding machine which includes a workpiece holder and a tool holder, wherein the tool holder is rotatable about a first axis of rotation and is arranged on a machining head which is pivotable via a swivel axis and is linearly movable via a first linear axis of movement, wherein a workpiece clamped in the workpiece holder can be machined by the tool clamped in the tool holder, wherein the gear grinding machine furthermore includes a dressing unit with a dressing tool holder which is rotatable about a second axis of rotation, the dressing unit rigidly arranged on a carriage on which the machining head is arranged, wherein a dressing tool accommodated in the dressing tool holder is used for dressing the tool clamped in the tool holder, comprising: during a dressing operation, pivoting the machining head about the swivel axis in dependence on a tool profile to be produced and linearly moving the machining head with the first linear axis of movement, wherein relative movements between the dressing tool and the tool, which produce a desired profile, are generated by a superposition of movements of the swivel axis and of the first linear axis of movement, and wherein the relative movements between the dressing tool and the tool are solely generated by a movement of the machining head.

11. The gear grinding machine according to claim 10, wherein the workpiece holder is rotatable about a third axis of rotation, and wherein the carriage is movable parallel to the third axis of rotation via a second linear axis of movement.

12. The gear grinding machine according to claim 11, wherein the machining head with the tool holder is movable relative to the carriage via the first linear axis of movement, so that for dressing purposes relative movements with two different degrees of freedom between the tool holder and the dressing tool holder are generated by the swivel axis and the first linear axis of movement.

13. The gear grinding machine according to claim 11, wherein the carriage is arranged on a machine column which is shiftable vertical to the third axis of rotation via a third linear axis of movement.

14. The gear grinding machine according to claim 11, wherein a second dressing unit is provided, which via a fourth linear axis of movement is moveable towards the first dressing unit and away from the same, in order to vary a distance between the dressing tools to be accommodated in the dressing tool holders of the first and second dressing units, and wherein the first dressing unit is configured to dress a first side of the tool and the second dressing unit is configured to dress a second side of the tool.

15. The gear grinding machine according to claim 11, wherein it is a gear grinding machine for manufacturing an internal toothing, wherein advantageously the machining head includes an arm on which the tool holder is arranged, wherein advantageously the arm extends radially to the swivel axis and thus creates a distance between the swivel axis and the tool holder.

16. The gear grinding machine according to claim 10, with the workpiece holder and two tool holders for accommodating separate tools, wherein the two tool holders each are rotatable about an axis of rotation and are arranged on a common machining head which is pivotable via a swivel axis, wherein a workpiece clamped in the workpiece holder is machined by tools clamped in the two tool holders, wherein the two tool holders are arranged on opposite sides of the machining head facing away from the swivel axis, wherein the two tool holders advantageously are arranged on a common axis of rotation or on parallel axes of rotation and/or are driven via a common drive, wherein furthermore advantageously the tools accommodated in the two tool holders can be dressed by at least one common dressing unit, wherein advantageously after dressing a first tool, a second tool can be moved towards the dressing unit by swiveling the machining head about the swivel axis.

* * * * *